(12) United States Patent
Huang (10) Patent No.: US 12,083,952 B1
(45) Date of Patent: Sep. 10, 2024

(54) REAR VIEW MIRROR INDICATOR

(71) Applicant: GIVING INDUSTRIAL CO., LTD., Changhua County (TW)

(72) Inventor: Tsung-Ming Huang, Changhua County (TW)

(73) Assignee: GIVING INDUSTRIAL CO., LTD., Changhua County (TW)

( * ) Notice: Subject to any disclaimer, the term of this patent is extended or adjusted under 35 U.S.C. 154(b) by 0 days.

(21) Appl. No.: 18/495,742

(22) Filed: Oct. 26, 2023

(51) Int. Cl.
*B60Q 1/26* (2006.01)
*B60R 1/12* (2006.01)

(52) U.S. Cl.
CPC .......... *B60Q 1/2665* (2013.01); *B60R 1/1207* (2013.01)

(58) Field of Classification Search
CPC ........ B60Q 1/26; B60Q 1/34; B60Q 1/26651; B60Q 1/2665; B60Q 2400/20; B60R 1/1207; B60R 1/006
See application file for complete search history.

(56) References Cited

U.S. PATENT DOCUMENTS

| 8,708,536 B1 * | 4/2014 | Mathieu | B60Q 1/2665 362/494 |
| 11,718,230 B2 * | 8/2023 | Ruel | B60R 1/12 359/838 |
| 2010/0182143 A1 * | 7/2010 | Lynam | B60R 1/1207 340/465 |

* cited by examiner

*Primary Examiner* — Peggy A Neils (57) ABSTRACT

A rear view mirror indicator includes a mirror, a light-emitting device, a first light-shielding plate, and a second light-shielding plate. The mirror is arranged on a mirror holder, there is a slot behind the mirror holder close to the side, and a grid-shaped transparent part is formed by laser engraving on the mirror in the slot to provide light emission. The light-emitting device has a circuit board, the circuit board is provided with a plurality of light-emitting parts, and the light-emitting parts can be arranged to form the required light shape. The first light-shielding plate is provided with at least one through hole.

7 Claims, 8 Drawing Sheets

REAR VIEW MIRROR INDICATOR

BACKGROUND OF THE INVENTION

Field of the Invention

This invention relates to a rear view mirror indicator that can provide more concentrated and soft light without excessive glare.

Description of the Related Art

The rear view mirrors are installed on both sides of the vehicle, allowing the driver to observe the situation behind the vehicle through the rear view mirror. It can also be used to determine whether there are oncoming vehicles on both sides of the vehicle, so that the driver can be prepared before changing lanes. To be alert and prepare in advance, and in order to produce an active reminder function, many car manufacturers currently install an additional directional flashing indicator light (i.e., rear view mirror direction light) inside the rear view mirror.

The conventional rear view mirror direction flash indicator light structure mainly has a mirror, and an outer cover is connected behind the mirror. A light-emitting device is arranged between the outer cover and the mirror. The mirror is in a position opposite to the light-emitting device. A light-transmitting part is provided, and the light-emitting device is used to emit alternating light and dark flash signals, and the light is emitted from the light-transmitting part, which can be used as a reminder for vehicle turning or failure.

However, the above-mentioned conventional structure still has the following problems in practical applications. The flash signal is directly emitted from the light-transmitting part, and is easy to diverge to the surroundings, which is not concentrated enough. The flash display light structure obviously has problems with poor prompting effect.

SUMMARY OF THE INVENTION

It is known that the flash signal of the conventional indicator is directly emitted from the light-transmitting part and easily spreads around, and this is a technical problem to be solved.

The vehicle rear view indicator of the present application includes a mirror, a light-emitting device, a first light-shielding plate, and a second light-shielding plate. The mirror is arranged on a mirror holder, so that the mirror can be combined with the rear view mirror cover through the mirror holder. There is a slot behind the mirror holder close to the side, and a grid-shaped transparent part is formed by laser engraving on the mirror in the slot to provide light emission so that the emitted light can be softer and not too dazzling. The light-emitting device has a circuit board, the circuit board is provided with a plurality of light-emitting parts, and the light-emitting parts can be arranged to form the required light shape. The first light-shielding plate is provided with at least one through hole. When the first light-shielding plate is combined with the front end surface of the circuit board, the light-emitting part can be accommodated in the through hole. The combination of a second light-shielding plate on the rear end surface of the circuit board will enable the light-emitting part to be shielded by the first light-shielding plate and the second light-shielding plate. The circuit board is fully covered so that the light emitted can only be concentrated in front of the through hole for illumination. The light-emitting device combined with the first light-shielding plate and the second light-shielding plate is installed and fixed in the slot, so that the light-emitting part and the through hole can be aligned with the transparent part, thereby, the vehicle rear view mirror direction flashing indicator can be formed.

Compared to the conventional rear view mirror indicator, the present invention has several advantages. First, in the vehicle rearview mirror direction indicator of the present invention, the light emitted by the light-emitting part can be blocked by the first light-shielding plate and the second light-shielding plate to avoid excessive divergence. The light emitted from the transparent part is concentrated, so the prompting effect is good, making it easier for vehicles or pedestrians behind to see the light emitted by the light-emitting part. Second, in the vehicle rearview mirror direction indicator of the present invention, the light-emitting device utilizes the cooperation of the first light-shielding plate, the second light-shielding plate, and the grid-shaped transparent part to help the light emitted by the light-emitting part concentrated but relatively soft, without causing excessive glare and discomfort.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE INVENTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

As shown in FIGS. 1 to 5, the rear view mirror indicator includes a mirror 10, a light-emitting device 20, a first light-shielding plate 30, and a second light-shielding plate 40. The mirror 10 is provided on a mirror holder 11, so that the mirror 10 can be combined with the rearview mirror cover (not shown) through the mirror holder 11.

A grid-shaped transparent part 101 is formed on the mirror 10 by laser engraving in the slot 111, and the grid-shaped transparent part 101 can make the light emitted relatively soft, without causing excessive glare and discomfort. The light-emitting device 20 includes a circuit board 21, and the circuit board 21 is provided with several light-emitting parts 22, so that the light-emitting parts 22 are arranged to form the required light shape. The first light-shielding plate 30 is provided with at least one through hole 31. When the first light-shielding plate 30 is combined on the front end surface of the circuit board 21, the light-emitting parts 22 can be accommodated in the through hole 31. The combination of the second light-shielding plate 40 on the rear end surface of the circuit board 21 will enable the light emitting parts 22 to be fully covered by the first light-shielding plate 30 and the second light-shielding plate 40, so that the light emitted can be only seen from the through hole 31. The light-emitting device 20, combined with the first light-shielding plate 30 and the second light-shielding plate 40, is installed and fixed in the slot 111, so that the light-emitting part 22 and the through hole 31 can be aligned with the transparent part 101.

The invention provides a vehicle rear view mirror indicator, wherein the mirror holder 11 includes a body 112 and a linkage mechanism 113 that is connected to an angle adjustment device of the rearview mirror cover.

The invention provides a vehicle rear view mirror indicator, wherein the light-emitting parts 22 are arranged in the shape of an arrowhead, so that the arrangement of the light-emitting parts 22 indicates the direction.

The invention provides a vehicle rear view mirror indicator, wherein the light-emitting parts 22 are LEDs.

The invention provides a vehicle rear view mirror indicator, wherein the transparent part 101 and the through hole 31 are configured in a plurality of shapes corresponding to the number of the light-emitting parts 22, as shown in FIGS. 1 to 4.

Figure 1:
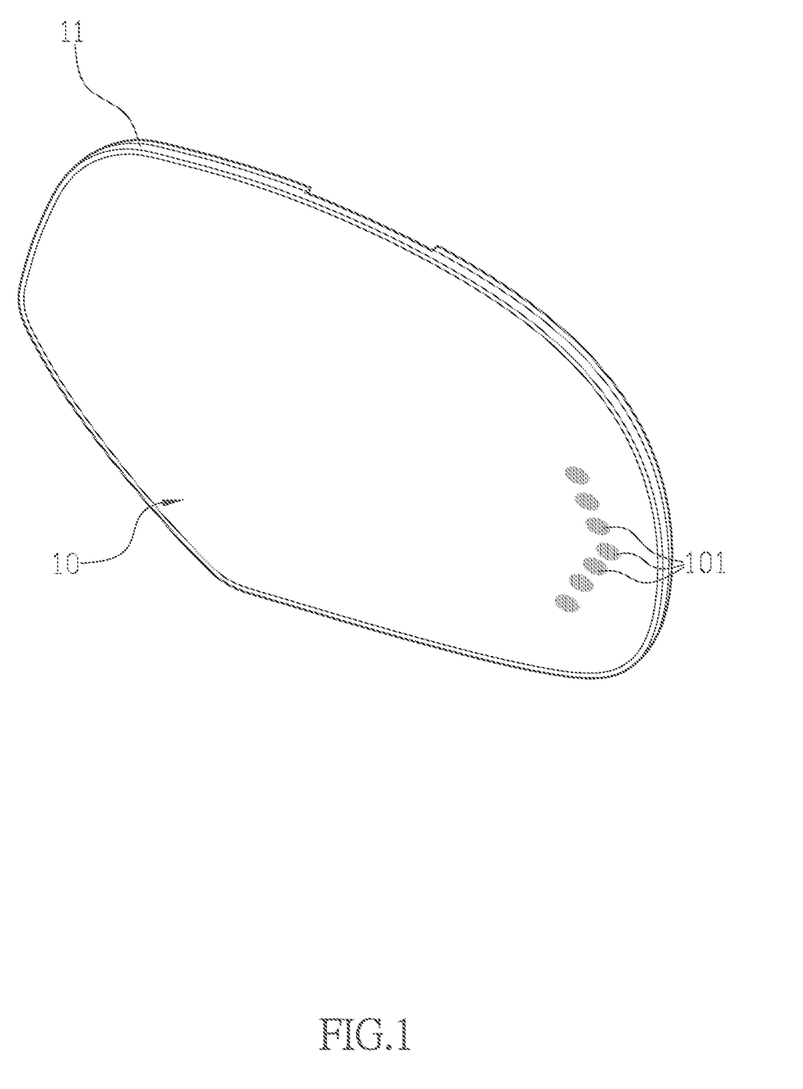
FIG. 1 illustrates a three-dimensional combination view of the present invention.
Figure 2:
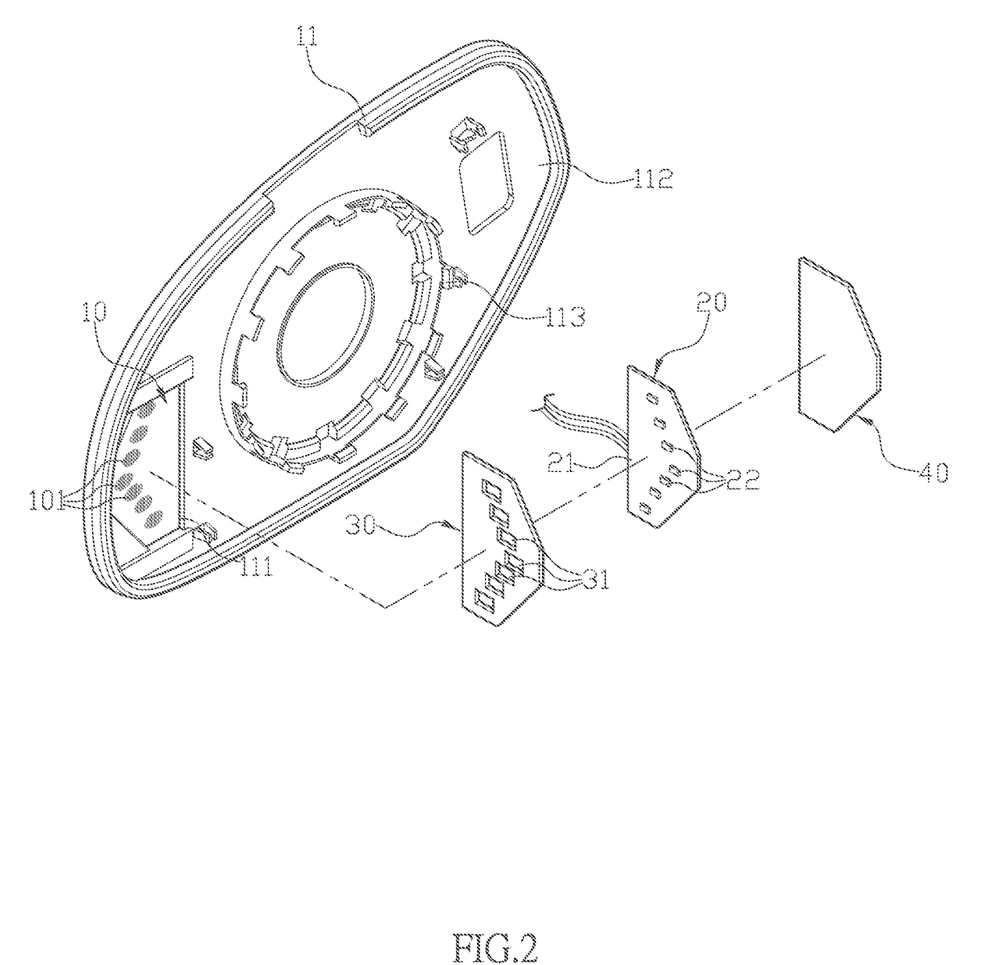
FIG. 2 illustrates an exploded three-dimensional view of the present invention.
Figure 3:
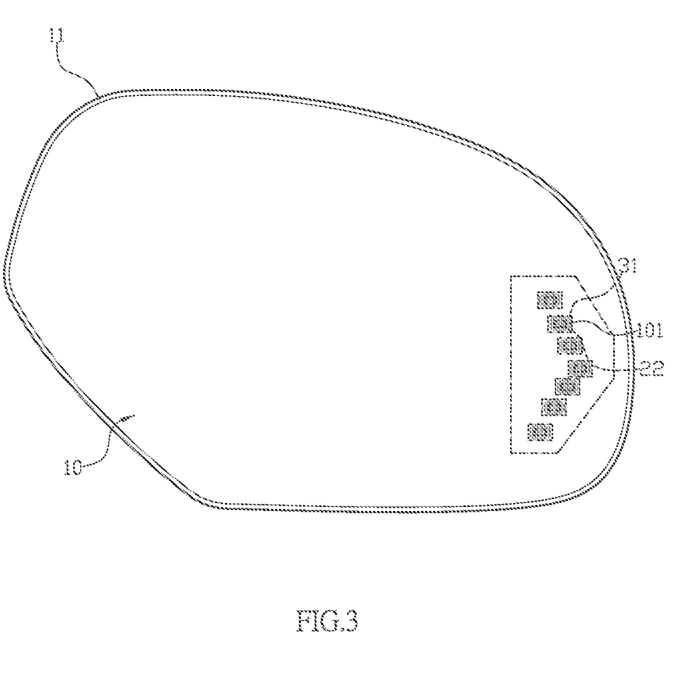
FIG. 3 illustrates a combined plan view of the present invention.
Figure 4:
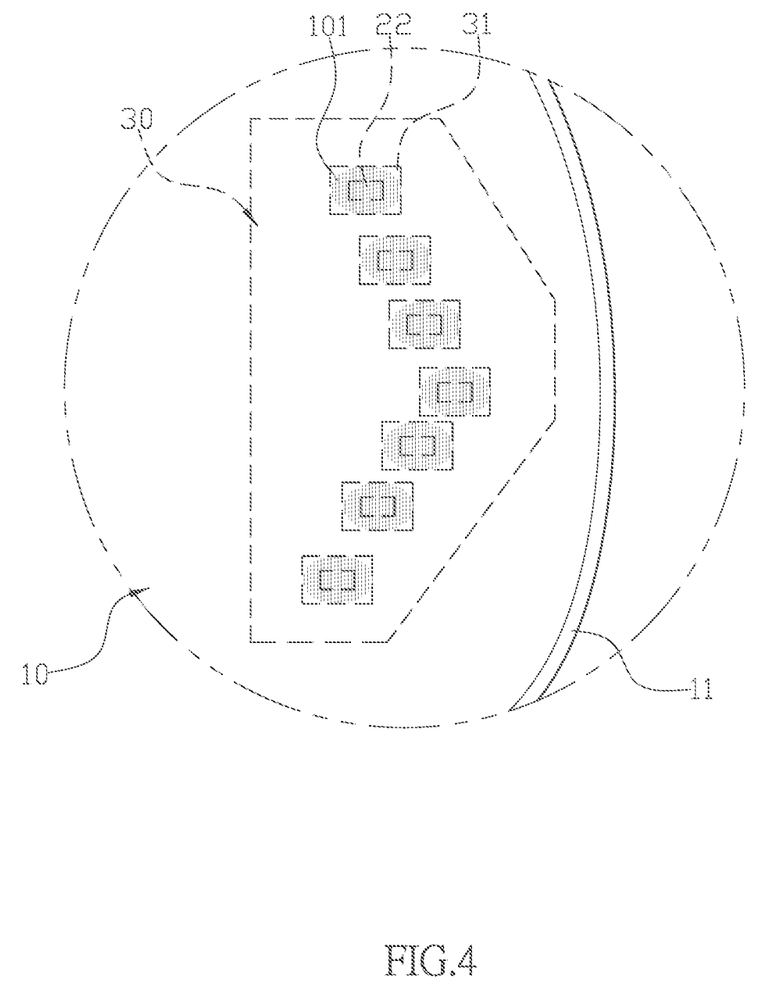
FIG. 4 illustrates an enlarged view of the combined plane of the present invention.
Figure 5:
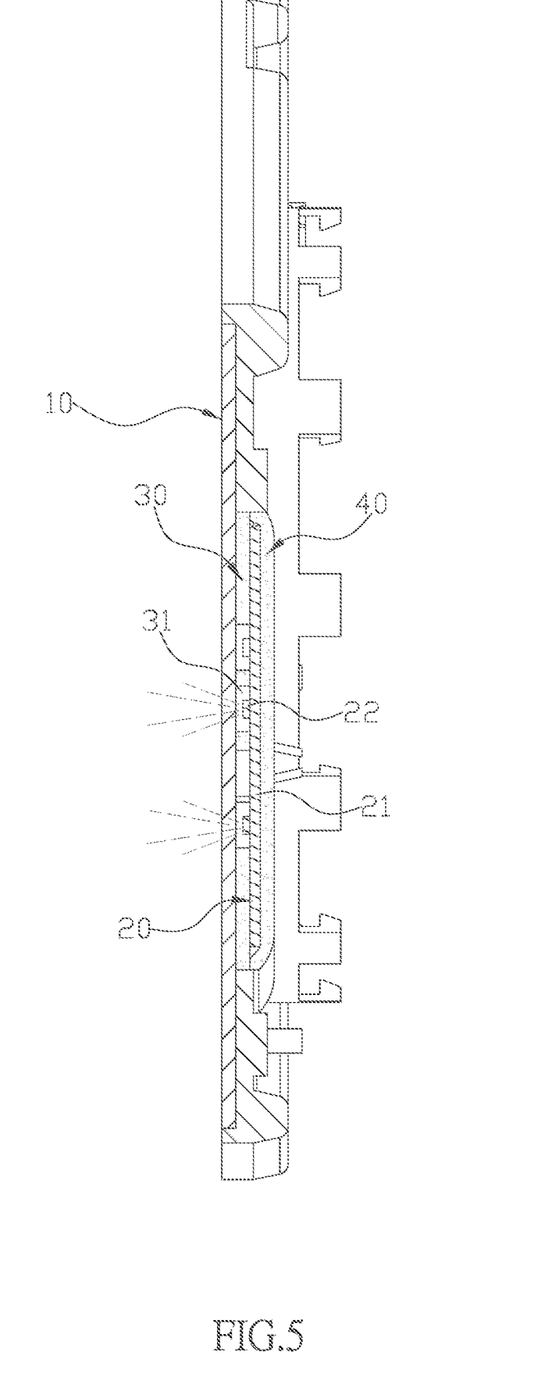
FIG. 5 illustrates a cross-sectional view of the present invention when it is used for lighting.
Figure 6:
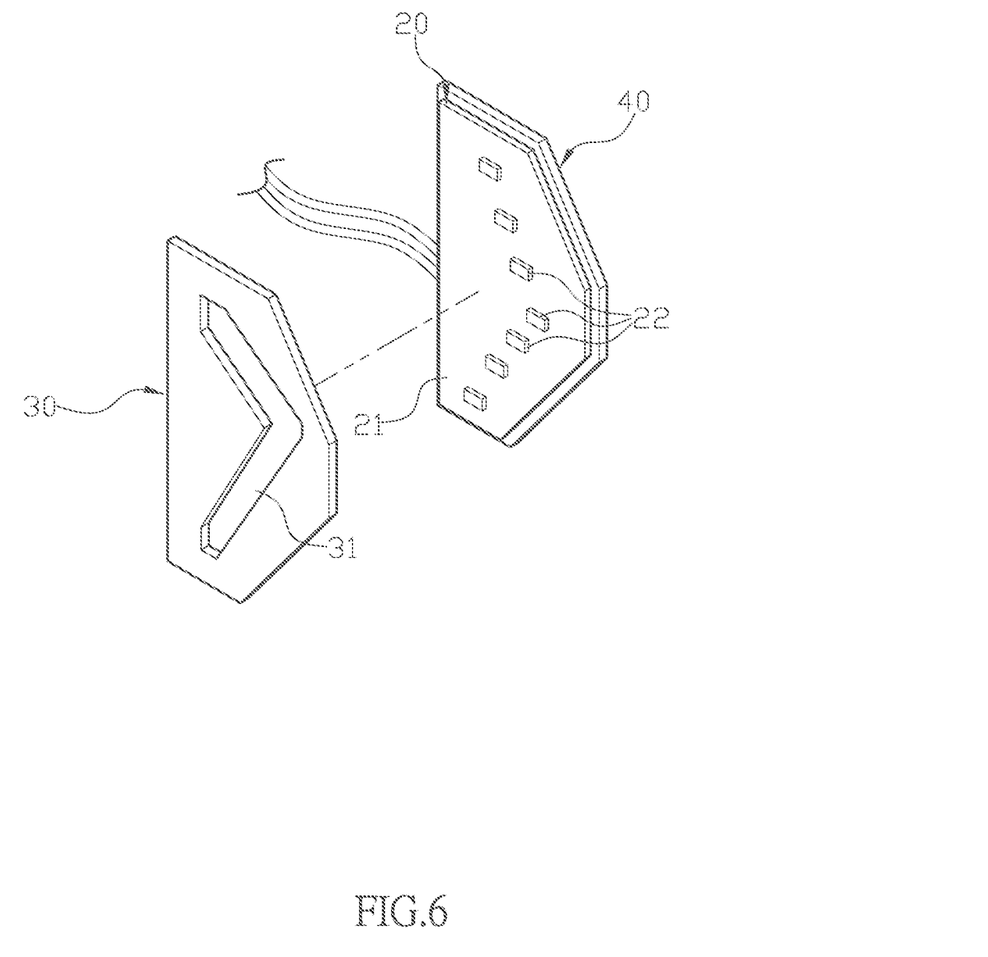
FIG. 6 illustrates an exploded perspective view of another preferred embodiment of the present invention.
Figure 7:
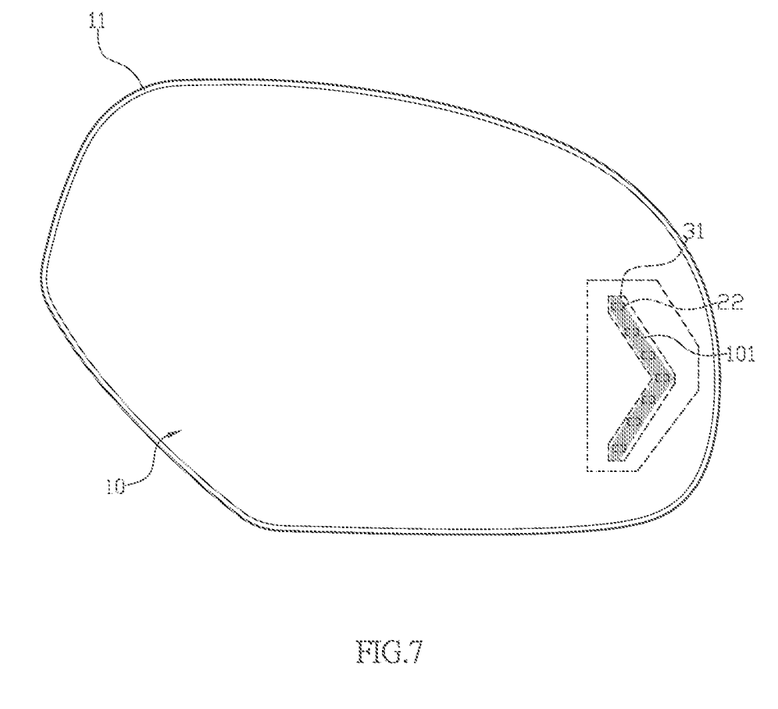
FIG. 7 illustrates an assembled plan view of another preferred embodiment of the present invention.
Figure 8:
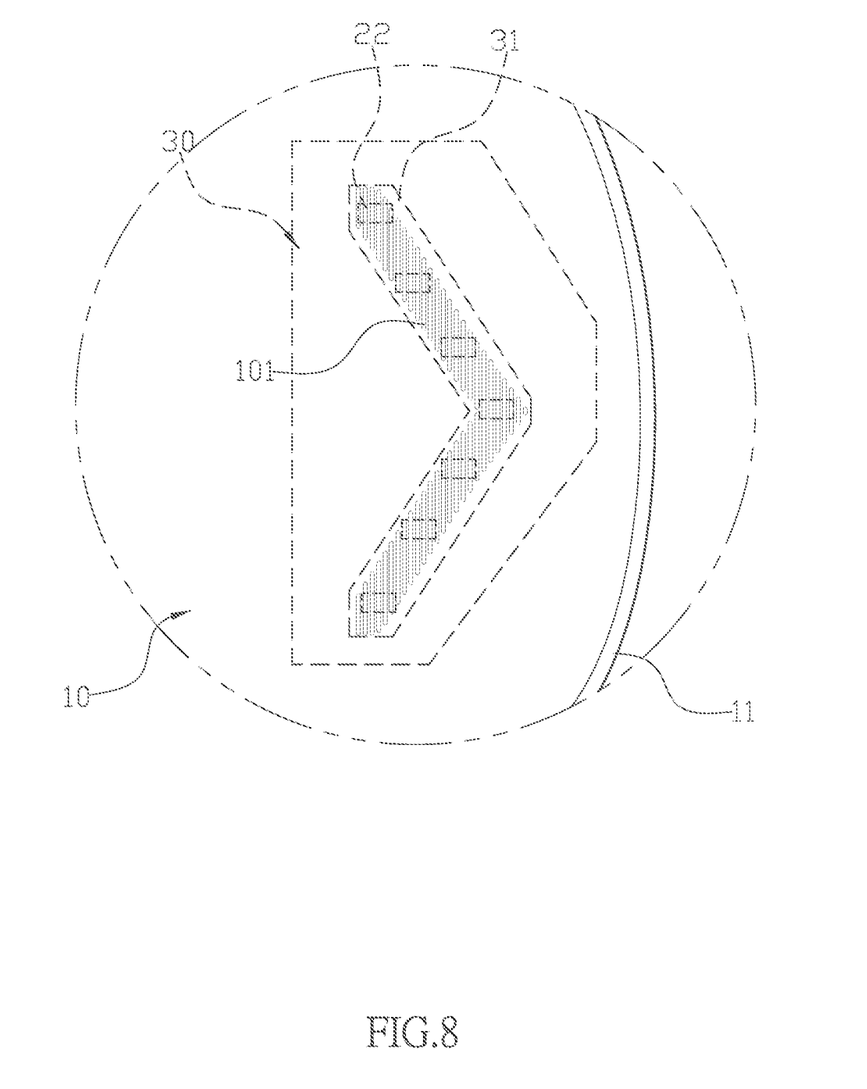
FIG. 8 illustrates an enlarged plan view of another preferred embodiment of the present invention.

The invention provides a vehicle rear view mirror indicator, wherein the transparent part 101 and the through hole 31 are arranged in a strip shape corresponding to the arrangement shape of the light-emitting parts 22, as shown in FIGS. 6 to 8.

The invention provides a vehicle rear view mirror indicator, wherein the first light-shielding plate 30, the circuit board 21, and the second light-shielding plate 40 are bonded to each other, so that the circuit board 21 can be sandwiched between the first light-shielding plate 30 and the second light-shielding plate 40.

The invention provides a vehicle rear view mirror indicator, wherein the light-emitting device 20 combined with the first light-shielding plate 30 and the second light-shielding plate 40 is installed and fixed in the slot 111 by adhesive.

The above-mentioned vehicle rear view indicator has the following advantages. First, in the vehicle rearview mirror indicator of the present invention, the light emitted by the light-emitting part 22 can be blocked by the first light-shielding plate 30 and the second light-shielding plate 40 to avoid excessive divergence. The light emitted from the transparent part is concentrated, so the prompting effect is good, making it easier for vehicles or pedestrians behind to see the light emitted by the light-emitting part 22. Second, in the vehicle rearview mirror indicator of the present invention, the light-emitting device 20 utilizes the cooperation of the first light-shielding plate 30, the second light-shielding plate 40, and the grid-shaped transparent part 101 to help the light emitted by the light-emitting part 22 concentrated but relatively soft, without causing excessive glare and discomfort.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A rear view mirror indicator, comprising: a mirror, a light-emitting device, a first light-shielding plate, and a second light-shielding plate;
   wherein the mirror is arranged on a mirror holder, a slot is formed behind the mirror holder close to a side, a grid-shaped transparent part is formed by laser engraving on the mirror in the slot, and a light emitted through the transparent part is softer and not too dazzling;
   the light-emitting device comprises a circuit board, the circuit board is provided with a plurality of light-emitting parts, and the light-emitting parts are arranged to form a required light shape;
   the first light-shielding plate is provided with at least one through hole; when the first light-shielding plate is combined with a front end surface of the circuit board, the light-emitting part is accommodated in the through hole; combining with the second light-shielding plate on a rear end surface of the circuit board, the light-emitting parts are shielded by the first light-shielding plate and the second light-shielding plate, and a light is concentrated and emitted to the front through the through hole; the light-emitting device combined with the first light-shielding plate and the second light-shielding plate is installed and fixed in the slot, so that the light-emitting part and the through hole are aligned with the transparent part.

2. The rear view mirror indicator of claim 1, wherein the light-emitting parts are arranged in a shape of an arrowhead, and an arrangement of the light-emitting parts indicates the direction.

3. The rear view mirror indicator of claim 1, wherein the light-emitting parts are LEDs.

4. The rear view mirror indicator of claim 1, wherein the transparent part and the through hole are configured in a plurality of shapes corresponding to a number of the light-emitting parts.

5. The rear view mirror indicator of claim 1, wherein the transparent part and the through hole are arranged in a strip shape corresponding to an arrangement shape of the light-emitting parts.

6. The rear view mirror indicator of claim 1, wherein the first light-shielding plate, the circuit board, and the second light-shielding plate are bonded to each other, and the circuit board is sandwiched between the first light-shielding plate and the second light-shielding plate.

7. The rear view mirror indicator of claim 1, wherein the light-emitting device combined with the first light-shielding plate and the second light-shielding plate is installed and fixed in the slot by adhesive.

* * * * *